Oct. 26, 1948.              S. L. ATKINS                2,452,175
                        LINE SECURING DEVICE
                         Filed Dec. 6, 1945
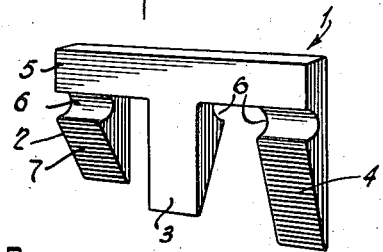
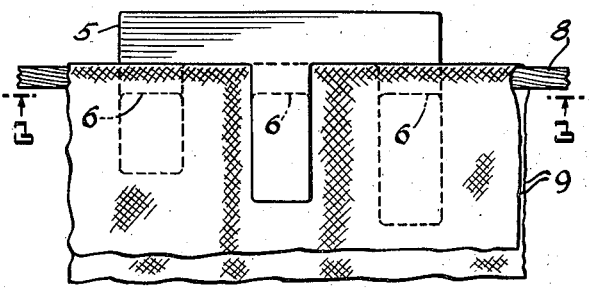
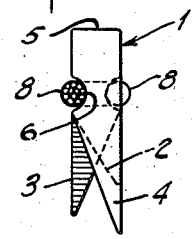
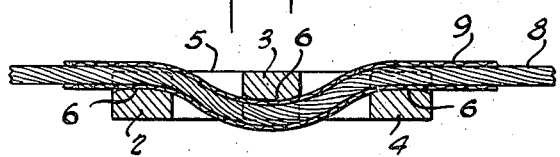
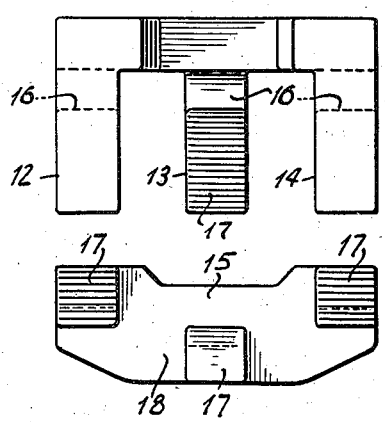
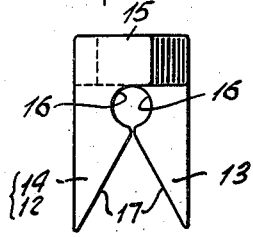
INVENTOR
SAMUEL LAWRENCE ATKINS
BY Charles H. Brown
ATTORNEY Patented Oct. 26, 1948

2,452,175

UNITED STATES PATENT OFFICE 2,452,175

LINE SECURING DEVICE

Samuel Lawrence Atkins, New York, N. Y.

Application December 6, 1945, Serial No. 633,235

2 Claims. (Cl. 24—137)

This invention relates generally to line securing devices, and particularly to such devices of the clothes-pin type.

An object of the invention is to provide a line securing device of simple construction which can easily be placed over a line and which will firmly grip the clothes upon the line at several spaced points.

Another object is to provide a clothes-pin having a plurality of legs or fingers in the same plane, each of which is provided at one end with a groove in which the clothes-line is adapted to lie, and also with a tapering portion extending over substantially its entire length.

A further object is to provide a line securing device having three spaced legs or fingers arranged substantially in the same plane and secured together at one end by a crosspiece, each finger having a tapering portion, and also a groove at or near the end which is secured to the crosspiece.

The following is a detailed description of the invention in conjunction with a drawing, wherein:

Fig. 1 illustrates one embodiment of the line securing device of the invention;

Fig. 2 shows the application of the device of Fig. 1 to a clothes-line;

Fig. 3 is a view of Fig. 2 along the line 3—3 in the direction of the arrows;

Fig. 4 is a right end view of the line securing device of Figs. 1 and 2 as seen upon a line without any cloth-like material being held in place by the device;

Fig. 5 illustrates another embodiment of the line securing device of the invention;

Fig. 6 is a bottom view of the device of Fig. 5; and

Fig. 7 is a right-end view of the device of Fig. 5.

Referring to Figs. 1, 2, 3 and 4 of the drawing, there is shown a line securing device or clothes-pin 1, preferably made out of metal, wood or plastic, having three equally spaced legs or fingers 2, 3 and 4 arranged in the same plane. These fingers are secured together at one end by a crosspiece member 5. Each finger is provided at that end which is nearest the crosspiece member with a horizontally arranged groove 6 in which the clothes-line 8 is adapted to lie. The finger is tapered at 7 from the groove to the free end, as shown, to enable the line securing device to slide freely over the clothes-line with a minimum pressure upon the device.

It should be noted that the grooves for the two outer fingers 2 and 4 appear on the same side of these fingers and are in the same straight line, while the groove for the center finger 3 appears on the opposite side. Thus, the groove on the middle finger 3 is not in the same straight line with the grooves on the outer fingers. This arrangement enables the device to lock the line 8 and grip the clothes upon the line very tightly. This locking effect and the grip upon the clothes is increased as the strain on the clothes line is increased by wind or the weight of the clothes. In order to remove the clothes from the line, the line securing device must first be released by the user.

Fingers 2, 3 and 4 are also shown as gradually differing in length from one end of the clothes-pin to the other. This construction may permit the pin to be more easily placed upon the line than if the fingers were of equal length. Either arrangement can be used in the practice of the invention.

In Fig. 2, the line securing device is shown firmly holding a piece of cloth 9 upon the clothes-line 8.

Figs. 3 and 4 clearly illustrate the manner in which the clothes-line 8 lies within the grooves 6 of the three fingers of the line securing device.

Figs. 5, 6 and 7 illustrate different views of another embodiment of the invention which is essentially similar to Fig. 1 except that the central finger is offset so as to enable the three grooves in the three fingers to lie on a single straight line.

The line securing device of Figs. 5, 6 and 7 is provided with three fingers 12, 13 and 14 of equal length, each provided with a tapering portion 17 and with a groove 16 at that end which is secured to the cross-piece member 15. If desired, these fingers may have differing lengths, as shown in Fig. 1. The center or middle part of the cross-piece member 15 bulges outwards to one side at 18, as a result of which the middle finger 13 is out of line with respect to the outer fingers 12 and 14, thereby permitting the grooves 16 of all three fingers to lie in a straight line, as shown in Fig. 7. The ends of crosspiece member 15 may be tapered, if desired, in order to conserve material and lighten the weight of the clothes-pin.

When the line securing device of Figs. 5, 6 and 7 is placed on a clothes-line, this line will not curve in the manner shown in Figs. 3 and 4, but will remain substantially straight on account of the linear arrangement of the grooves 16.

Although the line securing devices of the invention have been illustrated as having three fingers, it should be understood that the invention is not limited to this number, and that if desired a larger number of fingers can be employed.

What is claimed is:

1. A line securing device having a cross member, three spaced fingers extending in the same general direction from one side of and integral with said cross member, said fingers each having a groove at the end nearer said cross member and a tapered portion near the free end, the outer fingers being tapered on one side while the intermediate finger is tapered on the opposite side, the tapered portion on each finger being gradual and continuous in the same direction and substantially only on the side on which the groove is formed, the other side of the each finger opposite the tapered side being substantially straight and substantially perpendicular to the cross member.

2. A line securing device made of plastic material and having a cross member, three equally spaced non-abutting fingers of different lengths extending in the same general direction from one side of and integral with said cross member, said fingers each having a groove at the end nearer said cross member and a tapered portion near the free end, the outer fingers being tapered on one side while the intermediate finger is tapered on the opposite side, the tapered portion on each finger being gradual and continuous in the same direction and substantially only on the side on which the groove is formed, the other side of each finger opposite the tapered side being substantially straight and substantially perpendicular to the cross member.

SAMUEL LAWRENCE ATKINS.

REFERENCES CITED

The following references are of record in the file of this patent:

UNITED STATES PATENTS

| Number | Name | Date |
|---|---|---|
| 598,342 | Hawkins | Feb. 1, 1898 |
| 1,488,382 | Crow | Mar. 25, 1924 |
| 1,502,274 | Scott | July 22, 1924 |

FOREIGN PATENTS

| Number | Country | Date |
|---|---|---|
| 106,515 | Australia | Jan. 26, 1939 |
| 393,399 | Germany | Apr. 9, 1924 |
| 525,699 | France | June 15, 1921 |
| 606,555 | Germany | Dec. 5, 1934 |
| 725,458 | France | Feb. 12, 1932 |